US008167325B2

(12) United States Patent
Lee et al.

(10) Patent No.: US 8,167,325 B2
(45) Date of Patent: May 1, 2012

(54) CONTROL ARM OF MULTILINK SUSPENSION SYSTEM FOR VEHICLE

(75) Inventors: Hoo Gwang Lee, Suwon (KR); Jong Un Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 12/831,746

(22) Filed: Jul. 7, 2010

(65) Prior Publication Data

US 2011/0121533 A1    May 26, 2011

(30) Foreign Application Priority Data

Nov. 23, 2009   (KR) ........................ 10-2009-0113510

(51) Int. Cl.
*B60G 3/04* (2006.01)
*B60G 3/18* (2006.01)

(52) U.S. Cl. .... 280/124.134; 280/124.128; 280/124.135

(58) Field of Classification Search ........... 280/124.128, 280/124.129, 124.131, 124.132, 124.133, 280/124.134, 124.135, 124.136, 124.14, 280/124.148, 124.153
See application file for complete search history.

(56) References Cited

U.S. PATENT DOCUMENTS

| | | | | |
|---|---|---|---|---|
| 2,784,983 A | * | 3/1957 | Dean | 280/797 |
| 4,781,054 A | * | 11/1988 | Brown et al. | 72/306 |
| 5,362,090 A | * | 11/1994 | Takeuchi | 280/124.152 |
| 6,070,445 A | * | 6/2000 | Holierhoek | 72/61 |
| 2007/0257463 A1 | * | 11/2007 | Sanville et al. | 280/124.134 |
| 2011/0115186 A1 | * | 5/2011 | Chiku et al. | 280/124.134 |

* cited by examiner

*Primary Examiner* — Joseph Rocca
(74) *Attorney, Agent, or Firm* — Morgan, Lewis & Bockius LLP

(57) ABSTRACT

A control arm may be formed by assembling front and rear members respectively having upper and lower flanges so as to have a tubular cross-section, and a bending portion may be formed by bending the lower flange of the front member downwardly such that a drain hole is formed by the bending portion protruded downwardly when the front and rear members are assembled.

8 Claims, 8 Drawing Sheets

CONTROL ARM OF MULTILINK SUSPENSION SYSTEM FOR VEHICLE

CROSS-REFERENCE TO RELATED APPLICATION

The present application claims priority to Korean Patent Application No. 10-2009-0113510 filed in the Korean Intellectual Property Office on Nov. 23, 2009, the entire contents of which is incorporated herein for all purposes by this reference.

BACKGROUND OF THE INVENTION

1. Field of the Invention

The present invention relates to a control arm applicable to a suspension system provided with multilinks. More particularly, the present invention relates to a control arm of a multilink suspension system control arm which can drain foreign materials input through a jig hole for manufacturing the control arm through a drain hole easily.

2. Description of Related Art

A suspension system for a vehicle is disposed between a vehicle body and a wheel, and connects two rigid bodies by using one or more links.

An upward or downward load transmitted from a road to the wheel is supported by a spring and a hydraulic pressure shock absorber, and a load applied to other directions is supported by harmonizing high stiffness and flexibility. Therefore, the suspension system mechanically harmonizes a relative movement between the vehicle body and the wheel.

A various types of suspension systems is developed and applied to the vehicle, and one type of the suspension systems is a suspension system provided with multilinks which maximizes performance of high performance vehicles.

A rear-wheel suspension system of multilink type generally includes a wheel carrier rotatably supporting the wheel. A lower end portion of the wheel carrier is connected to a sub-frame of the vehicle body by using a lower control arm disposed along a width direction of the vehicle and is connected to the vehicle body by using a trailing arm disposed along a length direction of the vehicle.

In addition, an upper end portion of the wheel carrier is connected to the vehicle body by using two upper control arms disposed along the width direction of the vehicle.

The coil spring and the shock absorber are integrally or separately disposed along a height direction of the vehicle at a predetermined position of the lower control arm.

Accordingly, the load caused by bump and rebound of the vehicle is transmitted along movement traces of the lower control arm, the upper control arms, and the trailing arm, and the load is absorbed and reduced by shock-absorbing means consisting of the coil spring and the shock absorber.

The upper control arm 100 of the multilink suspension system, as shown in FIG. 7, has "U"-shape (that is, both ends thereof is positioned higher than a middle portion thereof) so as to prevent from being interfered with members of the vehicle body (e.g., side members of the vehicle body) disposed above the upper control arm 100. Particularly, most of a rear upper control arm 100 has the middle portion bent downwardly.

The upper control arm 100 is formed by assembling front and rear members 102 and 104 after the front and rear members 102 and 104 are manufactured by pressing steel plates. The front and rear members 102 and 104 are assembled with each other by a method such as welding. The upper control arm 100 as described above may be corroded by the foreign materials input into the upper control arm 100.

Jig holes 106 must be formed for manufacturing the front and rear members. If the upper control arm 100 is mounted at the vehicle, the foreign materials such as water and deicer are flowed into the upper control arm 100 through the jig hole 106. If there is no drain hole, the upper control arm 100 may be corroded. Further, in a case that corrosion fatigue occurs, the control arm may be broken during running the vehicle and deadly traffic accidents may occur.

In order to solve these problems, a conventional control arm is provide with a drain hole 108 formed at a lower middle portion such that the foreign materials fall downward and are exhaust through the drain hole 108 as shown in FIG. 8. Such a drain hole 108 can exhaust the foreign materials, but a cross-sectional area of the lower middle portion should be increased so as to bore the drain hole 108 with a sufficient size. Therefore, weight of the control arm may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a control arm of a multilink suspension system having advantages of forming a drain hole without increasing a cross-sectional area thereof and removing foreign materials through the drain hole.

In an exemplary embodiment of the present invention, the control arm apparatus may include a multilink suspension system having a plurality of multilinks, wherein the multilink includes at least a control arm, and wherein a drain hole is formed at a lowest portion of the at least a control arm by a joggle method.

In another exemplary embodiment of the present invention, the control arm apparatus may include a multilink suspension system having a plurality of multilinks, wherein the multilink includes at least a control arm, wherein the at least a control arm is formed by assembling front and rear members respectively having upper and lower flanges so as to have a tubular cross-section, and wherein a bending portion is formed by bending a portion of the lower flange of the front member downwardly such that a drain hole is formed by the bending portion protruded downwardly when the front and rear members are assembled.

The upper and lower flanges of the rear member may be respectively coupled to the upper and lower flanges of the front member inside the front member.

A cut portion corresponding to the bending portion of the front member may be formed at the lower flange of the rear member such that a drain hole is formed by the bending portion and the cut portion when the front and rear members are assembled.

The bending portion may be formed at a lowest portion of the lower flange of the front member.

In further another exemplary embodiment of the present invention, the control arm apparatus may include a multilink suspension system having a plurality of multilinks, wherein the multilink includes at least a control arm, and wherein the at least a control arm is formed by assembling front and rear members respectively having upper and lower flanges so as to have a tubular cross-section, and a bending portion is formed by bending a portion of the lower flange of the rear member downwardly such that a drain hole is formed by the bending portion protruded downwardly when the front and rear members are assembled.

The upper and lower flanges of the front member may be respectively coupled to the upper and lower flanges of the rear member inside the rear member.

A cut portion corresponding to the bending portion of the rear member may be formed at the lower flange of the front member such that a drain hole is formed by the bending portion and the cut portion when the front and rear members are assembled.

The bending portion may be formed at a lowest portion of the lower flange of the rear member.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
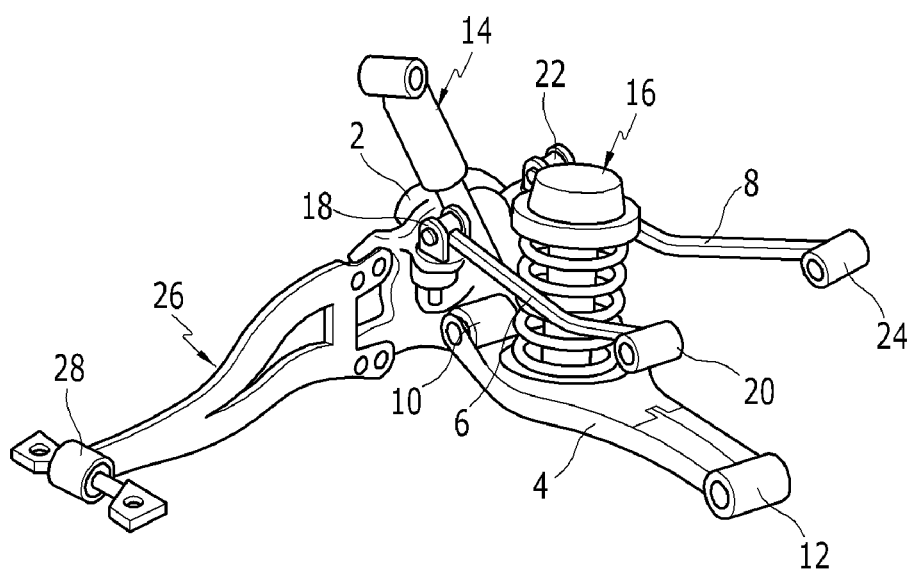
FIG. 1 is a perspective view of a multilink suspension system provided with an exemplary control arm according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a multilink suspension system provided with a control arm according to an exemplary embodiment of the present invention. A reference numeral 2 in FIG. 1 represents a wheel carrier rotatably supporting a wheel.

In order for the wheel carrier 2 to be connected to a vehicle body, a lower portion of the wheel carrier 2 is connected to the vehicle body through one lower control arm 4 disposed along a width direction of a vehicle, and an upper portion of the wheel carrier 2 is connected to the vehicle body through two upper control arms 6 and 8 disposed along the width direction of the vehicle.

The lower control arm 4 is disposed along the width direction of the vehicle on a center axis of the wheel, and both connecting portions 10 and 12 are connected respectively to the vehicle body and the wheel carrier 2 by interposing bushings therebetween.

A shock absorber 14 and a spring 16 are separately disposed vertically or slantedly on the lower control arm 4 so as to absorb and reduce upward and downward vibration input from the wheel. Therefore, vibration transmitted to the vehicle body is minimized.

The two upper control arms 6 and 8 are disposed along the width direction of the vehicle with a distance therebetween. A front upper control arm 6 is shorter than a rear upper control arm 8, and the two upper control arms 6 and 8 are disposed on or above the center axis of the wheel.

In addition, both connecting portions 18, 20, 22, and 24 of the upper control arms 6 and 8 are connected to the vehicle body by interposing rubber bushings therebetween.

It is exemplarily described in the drawings that all connecting portions 18, 20, 22, and 24 of the upper control arms 6 and 8 are connected to the vehicle body by interposing the rubber bushings, but the spirit of the present invention is not limited to this. That is, a ball joint instead of the rubber bushing may be used.

When the wheel bumps and rebounds in a state that the lower control arm 4 and the upper control arms 6 and 8 are disposed as described above, a load caused by the bump and rebound is transmitted to the vehicle body along a movement trace of the control arms 4, 6, and 8.

In addition, a front portion of the wheel carrier 2 is connected to the vehicle body through a trailing arm 26, and the trailing arm 26 is disposed along a length direction of the vehicle body. The trailing arm 26 has a plate shape wherein a rear portion thereof has a wider width than a front portion thereof.

In addition, upper and lower portion of the rear portion of the trailing arm 26 is fixed to the wheel carrier 2 by bolts, and a front connecting portion 28 of the trailing arm 26 is connected to the vehicle body by interposing a rubber bushing therebetween.

Therefore, even if brake torque is generated by a movement of the vehicle body when braking, the brake toque is absorbed and reduced by the trailing arm 26. Therefore, a stable brake performance may be achieved.

The upper control arms 6 and 8 in the multilink suspension system has "U"-shape (that is, both ends thereof is positioned higher than a middle portion thereof) so as to prevent from being interfered with side members of the vehicle body disposed above the upper control arms 6 and 8. Particularly, most of rear upper control arm 8 has the middle portion bent downwardly. In this specification, front and rear upper control arms 6 and 8 are called a control arm CA for describing the present invention easily and conveniently.

Figure 2:
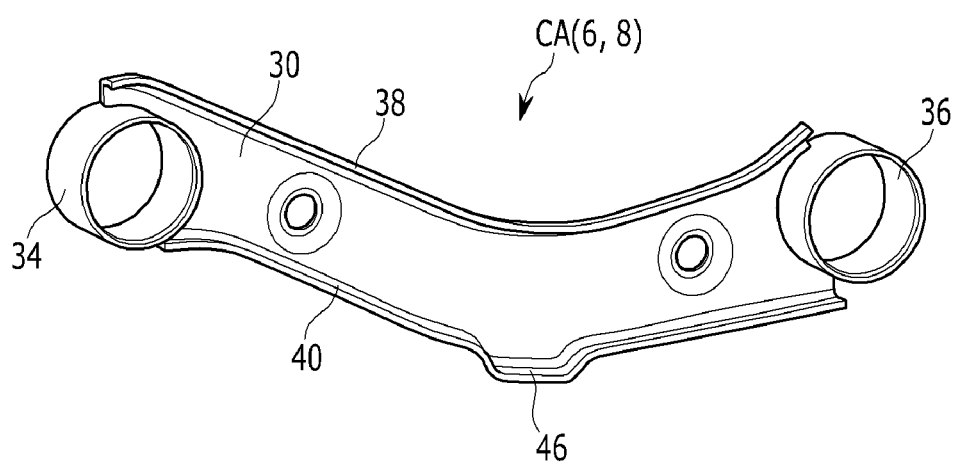
FIG. 2 is a perspective view of a front member forming an exemplary control arm according to the present invention.
Figure 3:
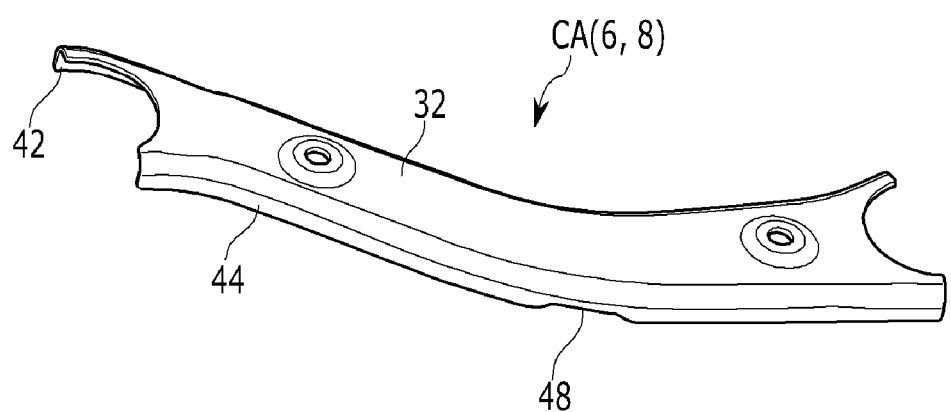
FIG. 3 is a perspective view of a rear member forming an exemplary control arm according to the present invention.
Figure 4:
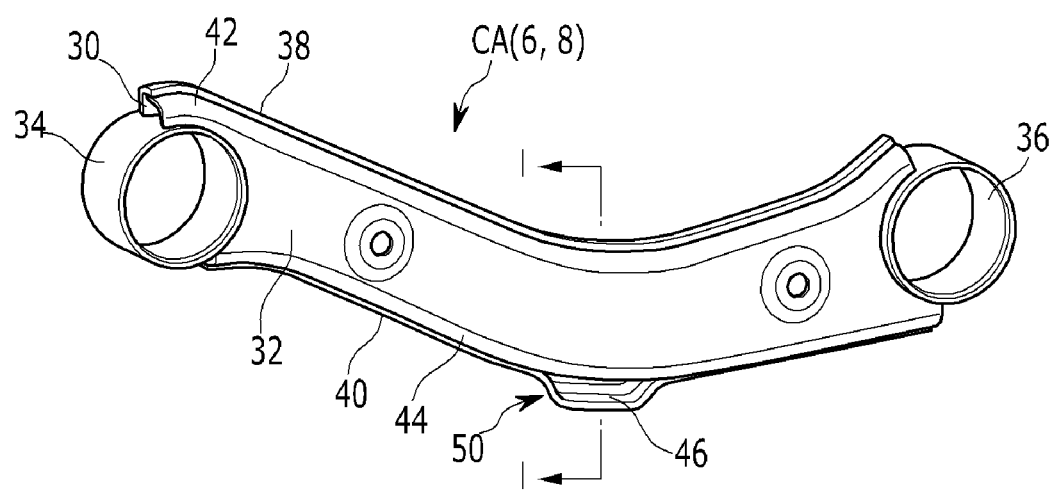
FIG. 4 is a perspective view of an exemplary control arm according to the present invention.
Figure 5:
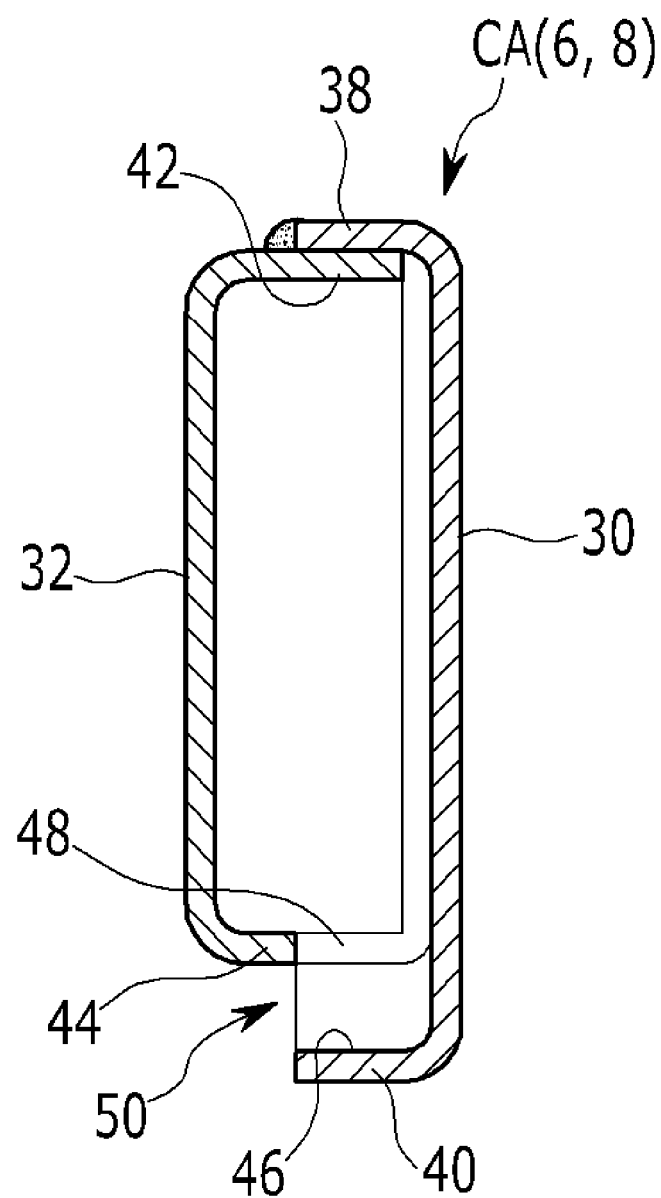
FIG. 5 is a cross-sectional view taken from a line I-I in FIG. 4.

FIG. 2 to FIG. 4 are perspective views of a control arm according to an exemplary embodiment of the present invention. The control arm CA is formed by assembling front and rear members 30 and 32 after the front and rear members 30 and 32 are manufactured by pressing steel plates. The front and rear members 30 and 32 are assembled with each other by a method such as welding. Eyes 34 and 36 forming connecting portions are mounted at both ends of the control arm CA.

More concretely, the front member 30 is formed of upper and lower flanges 38 and 40 bent rearward, and the rear member 32 is formed of upper and lower flanges 42 and 44 bent forward. Therefore, the upper and lower flanges 42 and 44 of the rear member 32 is inserted in the upper and lower flanges 38 and 40 of the front member 30, and the front and rear members 30 and 32 are welded so as to form a tetragonal tubular cross-section.

According to the control arm CA, a middle portion of the lower flange 40 of the front member 30 is bent so as to form a bending portion 46 protruded downwardly, and the lower flange 44 of the rear member 32 is cut so as to form a cut portion 48 corresponding to the bending portion 46.

In a case that the front and rear members 32 and 34 are assembled, one drain hole 50 is formed at a middle portion of the control arm 8 by the bending portion 46 and the cut portion 48.

That is, a drain hole 50 is formed by applying a joggle method (a method for forming a stepped portion at a plate) to the control arm CA according to an exemplary embodiment of the present invention.

The drain hole 50 can be formed without forming the cut portion 48 at the rear member 34, but it is preferable that the cut portion 48 is formed so as to increase cross-sectional area of the drain hole 50.

Since the cross-sectional area of the drain hole is increased by the joggle method without increasing cross-sectional area of a portion at which the drain hole is bored, weight of the control arm CA may be reduced. In addition, since the cut portion 48 is formed so as to form the drain hole, the weight of the control arm CA may further be reduced.

The drain hole 50 is formed at a lowest portion of the control arm CA so as to easily exhaust the foreign materials.

Figure 6:
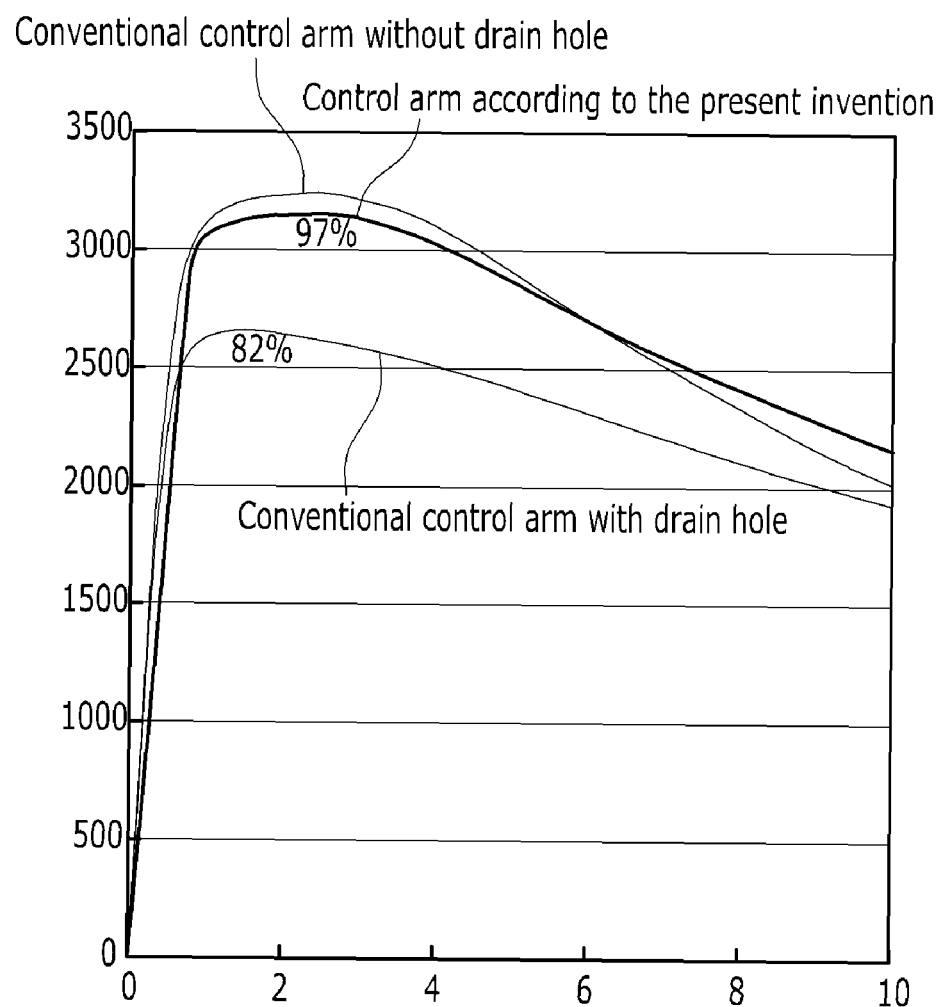
FIG. 6 is a graph showing buckling compression stress of control arms according to the present invention and conventional arts.
Figure 7:
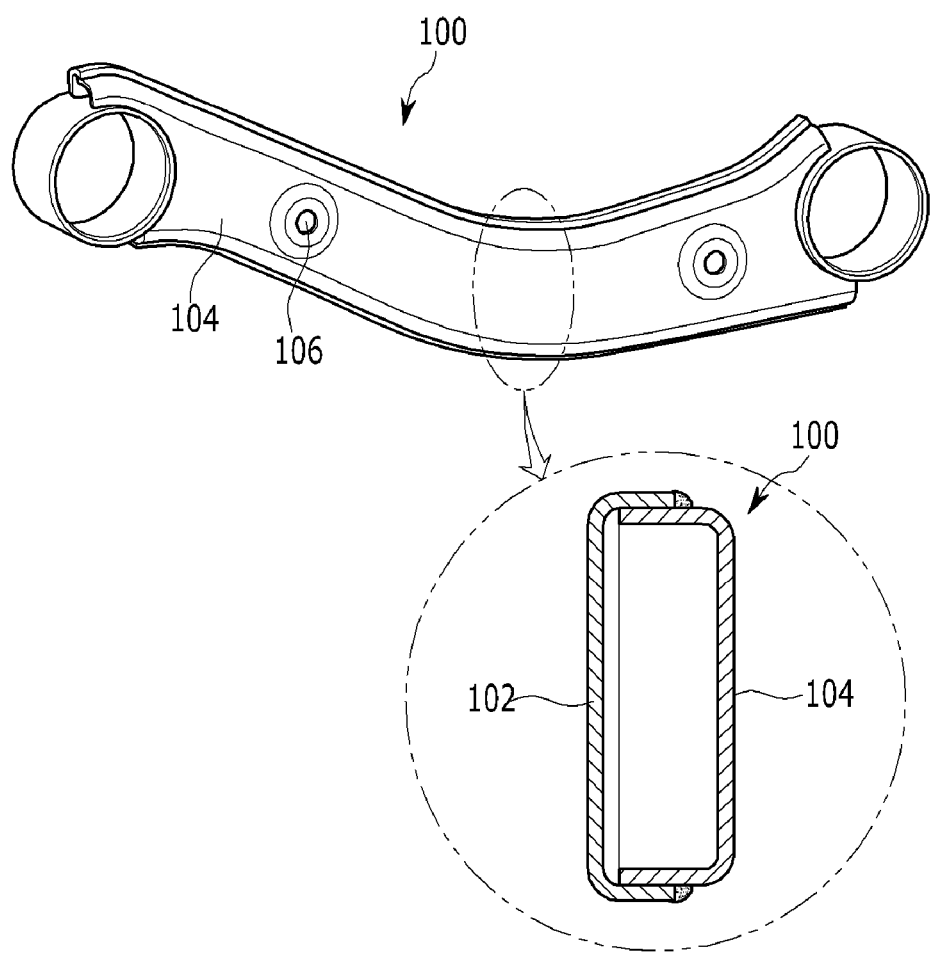
FIG. 7 is a perspective view and a cross-sectional view of a conventional control arm without a drain hole.
Figure 8:
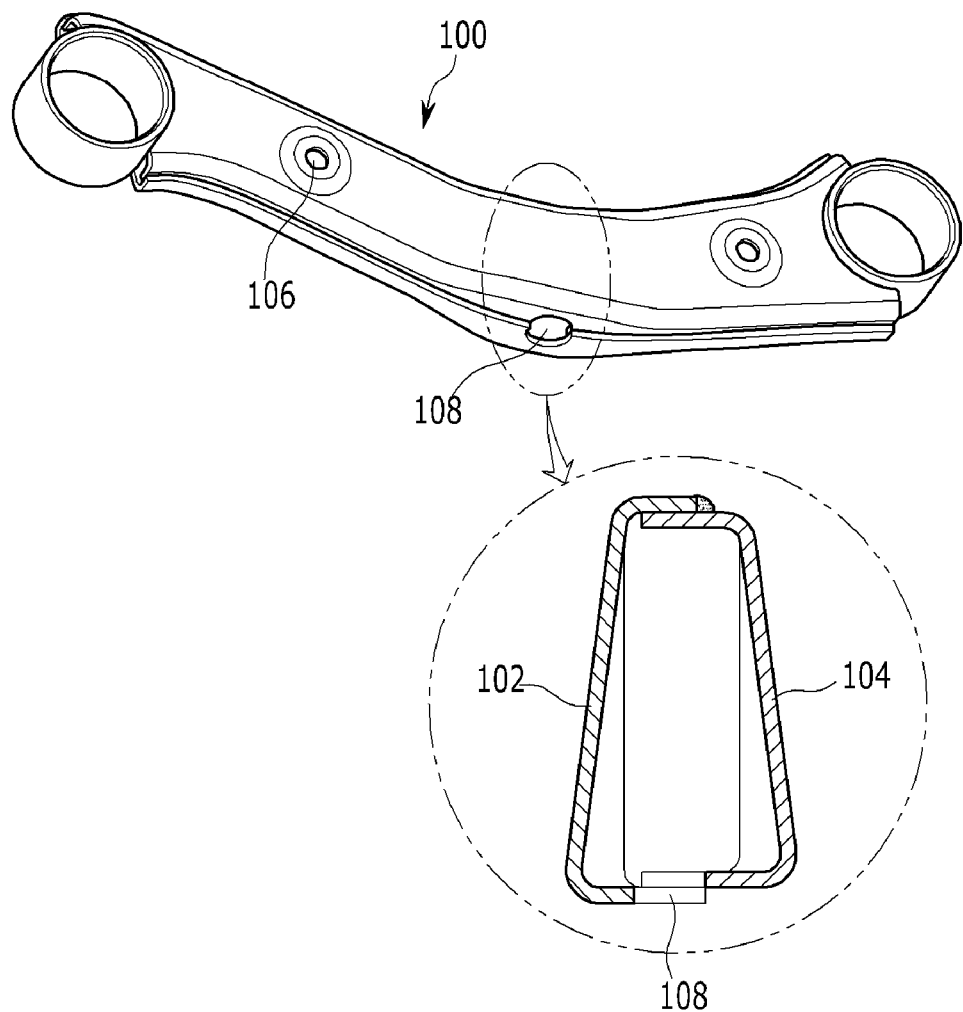
FIG. 8 is a perspective view and a cross-sectional view of a conventional control arm with a drain hole.

FIG. 6 is a graph showing buckling compression stress of control arms according to the present invention and conventional arts. As shown in FIG. 6, buckling compression stress of an exemplary embodiment of the present invention is 97% of that of a conventional control arm without the drain hole. Since the buckling compression stress of the conventional control arm with the drain hole is 82% of that of a conventional control arm without the drain hole, the exemplary embodiment of the present invention is excellent compared to the conventional control arm with the drain hole.

If reviewing the buckling stress to the load input to a various directions, the exemplary embodiment of the present invention has excellent stress characteristics compared with the conventional control arm with or without the drain hole.

Since a drain hole for exhausting foreign materials is formed by a joggle method without increasing a cross-sectional area of a control arm according to the present invention, weight of the control arm may be reduced. In addition, since a cut portion is formed so as to form the drain hole, the weight of the control arm may further be reduced.

For convenience in explanation and accurate definition in the appended claims, the terms "upper", "lower", "front", "rear", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A control arm apparatus of a multilink suspension system, the multilink suspension system comprising a plurality of multilinks,
    wherein at least one of the multilinks includes at least a control arm,
    wherein the at least a control arm is formed by assembling front and rear members respectively having upper and lower flanges so as to have a tubular cross-section, and
    wherein a bending portion is formed by bending a portion of the lower flange of the front member downwardly such that a drain hole is formed by the bending portion protruded downwardly when the front and rear members are assembled; wherein the bending portion protrudes below remaining portions of the lower flange.

2. The control arm apparatus of claim 1, wherein the upper and lower flanges of the rear member are respectively coupled to the upper and lower flanges of the front member inside the front member.

3. The control arm apparatus of claim 1, wherein a cut portion corresponding to the bending portion of the front member is formed at the lower flange of the rear member such that a drain hole is formed by the bending portion and the cut portion when the front and rear members are assembled.

4. The control arm apparatus of claim 1, wherein the bending portion is formed at a lowest portion of the lower flange of the front member.

5. A control arm apparatus of a multilink suspension system, the multilink suspension system comprising a plurality of multilinks,
    wherein at least one of the multilinks includes at least a control arm, and
    wherein the at least a control arm is formed by assembling front and rear members respectively having upper and lower flanges so as to have a tubular cross-section, and a bending portion is formed by bending a portion of the lower flange of the rear member downwardly such that a drain hole is formed by the bending portion protruded downwardly when the front and rear members are assembled; wherein the bending portion protrudes below remaining portions of the lower flange.

6. The control arm apparatus of claim 5, wherein the upper and lower flanges of the front member are respectively coupled to the upper and lower flanges of the rear member inside the rear member.

7. The control arm apparatus of claim 5, wherein a cut portion corresponding to the bending portion of the rear member is formed at the lower flange of the front member such that a drain hole is formed by the bending portion and the cut portion when the front and rear members are assembled.

8. The control arm apparatus of claim 5, wherein the bending portion is formed at a lowest portion of the lower flange of the rear member.

* * * * *